US007395510B2

(12) United States Patent
Diwan et al.

(10) Patent No.: US 7,395,510 B2
(45) Date of Patent: Jul. 1, 2008

(54) METHOD OF, AND SYSTEM FOR, ADJUSTING A DOCUMENT CONFIGURATION

(75) Inventors: Shridhar Diwan, Mountain View, CA (US); Henry W. Sang, Jr., Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

(21) Appl. No.: 10/738,178

(22) Filed: Dec. 16, 2003

(65) Prior Publication Data

US 2005/0132283 A1    Jun. 16, 2005

(51) Int. Cl.
G06F 13/00    (2006.01)
G06F 15/00    (2006.01)

(52) U.S. Cl. .................................. 715/801; 715/523
(58) Field of Classification Search ................. 715/513, 715/517, 751, 522, 523, 800, 801
See application file for complete search history.

(56) References Cited

U.S. PATENT DOCUMENTS

2003/0233620 A1* 12/2003 Vedullapalli et al. ........ 715/522
2004/0135805 A1*  7/2004 Gottsacker et al. .......... 345/751

* cited by examiner

Primary Examiner—Cao Nguyen

(57) ABSTRACT

A method of adjusting a document configuration includes the steps of generating a set of document configuration constraints that define an acceptable range of change in the look and feel of a document, the configuration of which is to be adjusted. The method includes modifying the document configuration while satisfying the set of document configuration constraints to minimize the change in the look and feel of the document.

25 Claims, 4 Drawing Sheets

METHOD OF, AND SYSTEM FOR, ADJUSTING A DOCUMENT CONFIGURATION

FIELD OF THE INVENTION

This invention relates to minimizing the change to the look and feel of a document while performing automatic document configuration adjustment. More particularly, the invention relates to a method of, and system for, adjusting a document configuration.

BACKGROUND TO THE INVENTION

A document's presentation, ie. its look and feel, is represented by a combination of its layout, formatting and content. For the sake of brevity, the layout, formatting and content of a document shall be referred to in this specification, unless the context clearly indicates otherwise, as the "document configuration".

A document's layout refers to the geometric arrangement of blocks comprising the document, sizes of the blocks, their aspect ratios and the distances between them. A block is a zone in which text appears or which contains an image. A block is referred to as a copy-hole or a placeholder.

A document's formatting refers to the choice of text font types, font styles, font sizes and font colors, or the like of text to be placed in those blocks.

A document's content refers to fixed data present in a template from which the document is generated as well as variable data merged with the template to produce a custom document.

In custom publishing, many situations arise where one may want to automatically adjust the layout either of a template used for generating the document or the instance custom document itself. Examples of such situations include:
1. to correct layout errors resulting from changes in the properties of the variable data. For example:
   a. a template block could be too small or too big for an image; or the image and the block may have different aspect ratios; or
   b. a block for a text box may be too small for the amount of text in the variable data;
2. to reuse a template for a different purpose. For example, one may want to reuse a template that produces a postcard to produce a poster, or to reuse a template that produces a document of 4 pages to produce a document of 6 pages;
3. to adjust the style of a document/template to better match the style requirements of a specific tradeshow or that of a specific dealer.

In all of these cases and others, a graphic artist typically creates a template with an optimized layout. The layout is optimized for variable data with specific properties (certain amount of text, images with certain sizes and aspect ratios, etc.) and specific style requirements. If the customer wanted to reuse the template for data with different properties, or wanted to reuse it for a different purpose, he or she, typically, would be forced to go back to the graphic artist for a new template, costing a significant amount of time and money. It is extremely cost and time efficient if the template or the produced custom document could be automatically adjusted either to correct layout errors or for reuse purposes.

The kinds of documents/templates that predominantly show configuration adjustment problems are so called "layout driven" document/templates. Layout driven documents are characterized by a rigid layout of blocks with fixed sizes and positions. Any content must fit its allocated block. Examples of layout driven templates include real estate and other advertisements and flyers, product catalogs, newspapers and magazines. Layout driven templates can be contrasted with "content driven" or flow based templates that are characterized by content flowing from page to page without a rigid block layout structure. Examples of content driven documents are technical reports, research papers, product data sheets, brochures, etc. Most documents have both layout driven as well as content driven properties. This invention is mainly applicable to templates/documents that are predominantly layout driven. While adjusting a document, it is necessary to minimize the change in its look and feel as much as possible or at least keep it in an acceptable range. While doing layout adjustment, it is necessary to preserve the look and feel of the original layout as much as possible. This is because the graphic artist produces the original layout by considering various factors such as aesthetics, branding and style requirements and optimizes the template to cater for these factors. Venturing too far away from the original look and feel can lead to templates or documents that are aesthetically unpleasant and/or nonconforming to the branding or style requirements.

SUMMARY OF THE INVENTION

According to the invention, there is provided a method of adjusting a document configuration. The method includes generating a set of document configuration constraints that define an acceptable range of change in the look and feel of a document whose configuration is to be adjusted. The document configuration is modified while satisfying the set of document configuration constraints to minimize the change in the look and feel of the document.

An embodiment of the invention is now described below, by way of example, with reference to the accompanying drawings.

DETAILED DESCRIPTION OF EMBODIMENTS

Figure 1:
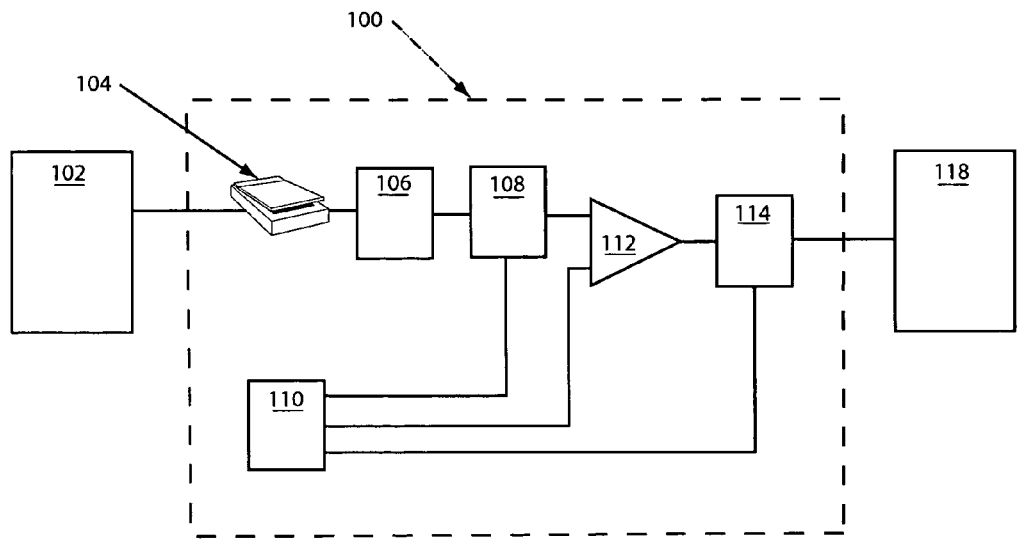
FIG. 1 shows a schematic block diagram of a system, in accordance with an embodiment of the invention, for adjusting a document configuration.

Referring initially to FIG. 1 of the drawings, an example of a system for adjusting a document, is designated generally by reference numeral 100. The system 100 modifies a document 102 to adjust its document configuration as will be described in greater detail below.

For the sake of brevity in the description and claims that follow, the term "document" is to be understood, unless the context clearly indicates otherwise, as referring to a template from which a document is produced or the produced document itself.

The document 102 is read by the system by a reading device such as a scanner 104. The read document is then analysed by an analyser 106 and is parsed into its constituent components, more particularly, blocks constituting the document 102.

Once the document 102 has been analysed, data relating to the analysed document is fed to a modification module 108 connected to an output of the analyser 106. The module 108 effects adjustment of the document subject to a predetermined set of constraints. These constraints are accessed by the module, for example, from a database 110. It is to be noted that the constraints could also be provided externally of the system 100, for example, from a user input.

Once the configuration of the document 102 has been adjusted by the modification module 108, the adjusted document 102 is compared with the set of the constraints by means of a comparator 112. The comparison is done to ensure that the adjusted document 102 satisfies the chosen set of constraints.

An embodiment of the system 10 includes a quantifier 114 connected to an output of the comparator 112 and/or the modification module 108. The quantifier 114 makes use of a "change value" to quantify the extent to which the look and feel of the document 102 has been changed.

Once it has been determined that the adjusted document 102 satisfies the set of constraints, a modified document 118 is generated and output by the system 10.

The manner in which a document is adjusted will now be described in greater detail with particular reference to FIGS. 2 and 3 of the drawings.

Figure 2:
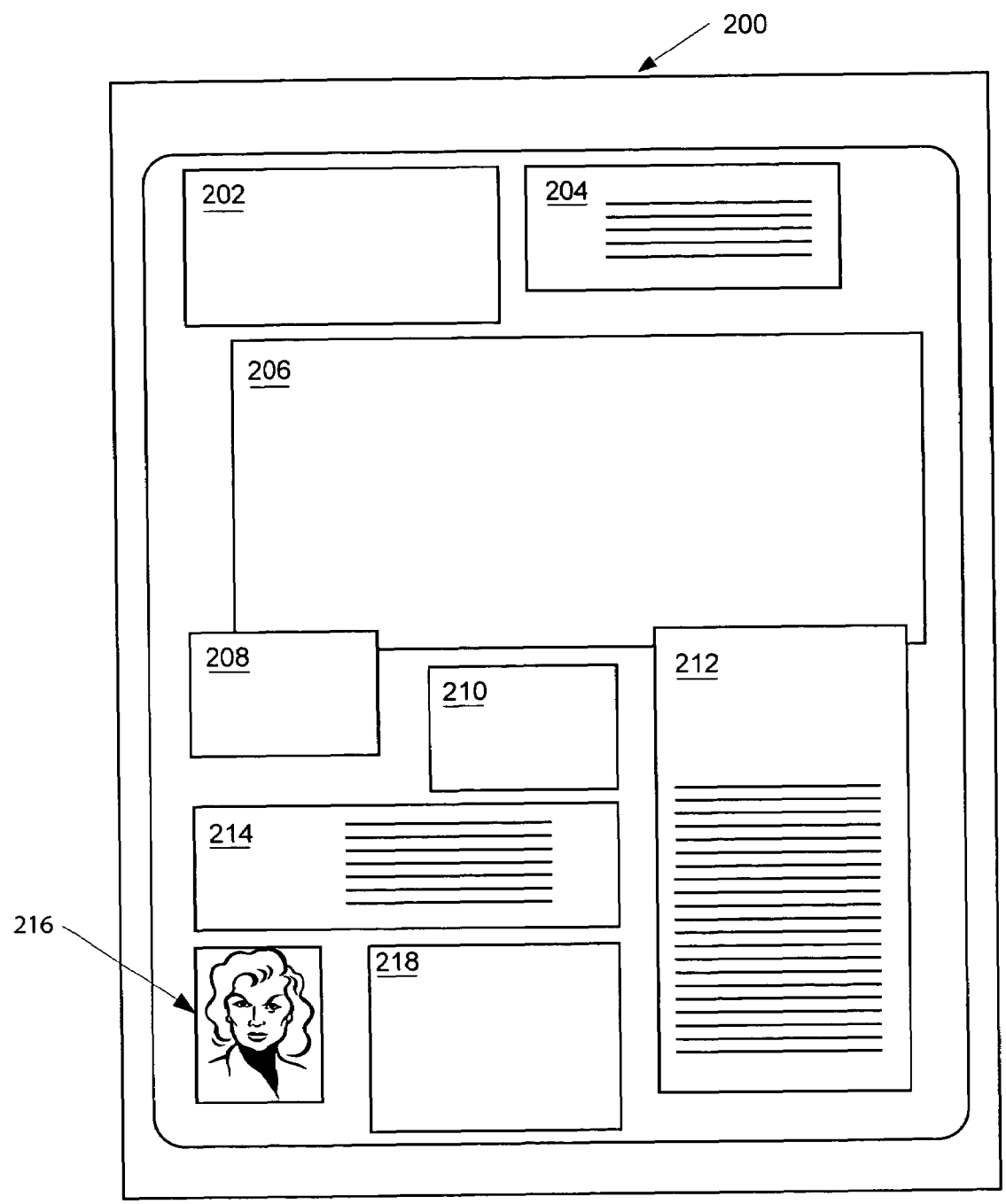
FIG. 2 shows an example of a document, the document configuration of which is to be modified in accordance with an embodiment of the invention.

Referring to FIG. 2 of the drawings, reference numeral 200 designates a document, the configuration of which is to be adjusted in accordance with an embodiment of the invention. The document 200 comprises a plurality of document components in the form of blocks 202, 204, 206, 208, 210, 212, 214, 216 and 218 constituting the layout of the document 200.

The document 200 is a real estate flyer advertising the sale of a property. The blocks 202, 206, 208 and 210 contain photographic images of the property being sold.

The block 204 contains laudatory text relating to the property. The block 212 contains a list of features of the property. In block 214, there is provided text relating to details of the property. Blocks 216 and 218 contain a photographic image of the realtor and contact details of the realtor respectively.

The look and feel of the document 200 is modelled by the use of a set of predetermined constraints. More particularly, the look and feel of the document 200 is modelled by the combination of layout constraints, formatting constraints and content constraints. In order to minimize the change to the look and feel of the document 200, it is required that, when the document configuration is modified, its modified configuration continues to satisfy the selected constraints.

It is to be noted that the set of constraints can be automatically generated (particularly with respect to layout constraints) and/or the constraints may be generated by user input.

The various categories of constraints are now discussed in more detail.

Layout Constraints

The look and feel of the layout of the document 200 is modelled by the combination of the following criteria: an adjacency graph of the blocks 202-218 of the document 200, white spaces relating to the space between the blocks 202-218, block size and aspect ratios for the blocks 202-218, block positions for the blocks 202-218, alignment relationships in respect of the blocks 202-218 and overlap relationships applicable to those of the blocks 202-218 that overlap. The constraints in respect of these criteria are now described more fully.

Adjacency graph based constraints are constraints that specify the relative positions of blocks of a document with respect to each other. The adjacency graph for a set of blocks defines the adjacency relationship between them in the form of directions: N, S, E, W, NE, NW, SE and SW. The applicable constraint could be that the adjacency graph of the document 200 be preserved while doing layout adjustments. This constraint could also be specified in more relaxed terms as: the N, S, E and W adjacency constraints must be preserved while a constraint such as NE may change either to N or to E but not any further.

White space constraints are constraints on the amount of white space between a set of blocks of a document. These could be specified for a particular set of blocks of the document or for all blocks in the document (ie. either locally or globally). Examples are:

The white space between blocks A and B may not be changed by more than 20%;

The white space between blocks A and B must be between 1 and 1.2 inches;

The white space between any two blocks may not change more than 40%.

Block size and aspect ratio constraints are constraints on the sizes and aspect ratios of blocks of a document. These could be specified on a per block basis or globally.

These constraints could also be specified separately for width and height. Examples are:

Block A's size can vary up to 10% from its original size while maintaining aspect ratio;

The size of no block may change more than 20%;

Block C's width may not change more than 20% and height not more than 10%;

No image may be non-uniformly scaled (ie. must preserve aspect ratio).

Block position constraints are constraints on how much blocks of a document may be moved in the document from their original positions. For example, a block may not move more than 0.5 inches either in a horizontal or a vertical direction from its original position.

Alignment constraints are constraints that specify how blocks of a document are aligned with respect to each other, for example, edge alignment constraints between a set of blocks, such as left edge alignment constraints, top edge alignment constraints etc.

Overlap constraints are constraints that specify the change allowed in the amount of overlap between a set of blocks of a document. For example, if two blocks overlap, a constraint could specify the maximum and minimum amount of overlap in either vertical or horizontal direction. The maximum amount of change allowed could also be specified as a percentage of the existing amount of overlap.

Formatting Constraints

The look and feel of the formatting of the document 100 is governed by the combination of font sizes, font types, font styles and font colors in respect of text in any of the blocks 204, 212 or 214 of the document 200. Font size constraints are specified as max/min font sizes. Font type and style constraints provide an enumeration of allowable font types (for example, Times New Roman, Helvetica) and font styles (for example, bold, italic, underline). Color constraints provide a set of allowable colors for text, background, fill etc.

Content Constraints

The look and feel of the content of the document 200 is governed by what is contained in the blocks 202-218 of the document 200. Examples of the content of the blocks 202-218 of the document 200 shown in FIG. 2 of the drawings are images contained in the blocks 202, 206, 208, 210 and 216 and a list of items such as that contained in the block 212. In this example, the content constraints are, firstly, constraints on images and, secondly, constraints on lists of items.

The constraints on images specify the maximum amount of overlap allowed from all four directions and/or the maximum amount of cropping allowed from all four directions. The constraints on lists of items specify the minimum number of items that must be included in the produced custom document 200.

The selected set of constraints merely specify acceptable limits on the changes to the look and feel of the document 200 when its configuration undergoes modification. The only thing that is guaranteed is that, by satisfying the set of selected constraints, the modified document 200 maintains an acceptable look and feel. In general, it is desired to minimize the changes to the look and feel of the document 200 while still staying within the acceptable range as governed by the constraints. To ensure that the changes to the document 200 stay within that acceptable range, a "change value" function based on the constraints is provided. The "change value" measures the change to the document's look and feel and can also be used to minimize the change. The "change value" function is a constraint optimization function.

While the "change value" function for the document 200 could adopt many different forms, in this example, it is written as a weighted sum of the change values for layout, formatting and content as follows:

$$C_{document} = K_{layout} * C_{layout} + K_{formatting} * C_{formatting} + K_{content} * C_{content} \quad \text{Equation 1}$$

where $C_{document}$ is the change value for the document;

$C_{layout}$, $C_{formatting}$, $C_{content}$ are the change values for layout, formatting and content, respectively; and $K_{layout}$, $K_{fomatting}$, $K_{content}$ are their corresponding weight constants.

The constants will typically be determined based on heuristics and experimentation in each case. It will be appreciated that, in effect, the "change value" function is really a cost function that gives different costs for different changes to the document's look and feel. Thus by minimizing the "change value" function, the cost associated with modifying the document 200 is minimized.

The size of the constants governs the weighting to be applied to the constraints. The greater the value of the constant, the higher the weighting of that constraint. A higher weighting of a constant also indicates that, to make a change associated with that constraint will be more costly than making a change associated with a constraint having a lower weighting.

For example, if the constant associated with "font size" is large, that means that font size adjustments are to be avoided as much as possible. If a constant is zero, an adjustment associated with that particular constant is basically free which means that there is no limit to the adjustment that can be made as long as the other constraints are satisfied. Thus, if the constant for "white space adjustment" is zero, there is no limit to the amount of change to the white space in the document 200, subject to the other constraints being satisfied.

The "change value" for each of the components of Equation 1 are now considered separately.

The "change value" for the layout is simply written as a sum of the change in the position and dimension of all the blocks, 202-218 of the document 200, ie. it measures the variation in the block locations and dimensions. Thus the "change value" for the layout is as follows:

$$C_{layout} = \Sigma_{all\ blocks} (\text{delta (position)} + \text{delta (dimensions)}) \quad \text{Equation 2}$$

If the block's top left corner is originally at ($X_{original}$, $Y_{original}$), its width is $Width_{original}$, its height is $Height_{original}$ and if its adjusted top left corner is at ($X_{adjusted}$, $Y_{adjusted}$), its adjusted width is $Width_{adjusted}$ and its adjusted height is $Height_{adjusted}$ then:

delta (position)=$abs$ ($X_{adjusted}-X_{original}$)+
$abs$ ($Y_{adjusted}-Y_{original}$)

delta (dimension)=$abs$ ($Width_{adjusted}-Width_{original}$)+
$abs$ ($Height_{adjusted}-Height_{original}$)

where "abs" stands for the mathematical absolute value.

The "change value" for the formatting of the document 200 is written in terms of the font size changes, font type changes, font style changes and color changes.

In order to measure the formatting change value, numerical values may be assigned to font types and to font styles so that their difference is able to be computed. Another approach is to define any change in font style or font type as 1 unit of change.

As opposed to font types and styles, font sizes in points are directly used in the formula. Similarly, colors as points in the RGB space are used directly in the "change value" for the formatting. Difference between two colors will be the Euclidian distance between their RGB point representations. Thus the "change value" for formatting is as follows:

$$C_{formatting} = \Sigma_{all\ font\ size\ changes} (K_{font-size} * (\text{font size change in points})) + \Sigma_{all\ font\ type\ changes} (K_{font-type} * (\text{font type change})) + \Sigma_{all\ font\ style\ changes} (K_{font-style} * (\text{font style change})) + \Sigma_{all\ color\ changes} (K_{color} * (\text{Euclidian distance between the original and the adjusted color})). \quad \text{Equation 3}$$

where $K_{font-size}$, $K_{font-type}$, $K_{font-style}$ and $K_{color}$ are weight constants.

The "change value" for content measures various things such as:

Change in amount of block overlap, measured as the amount of change in overlapping area with respect to the block area;

For an image that is cropped to make it fit its block, the amount of cropped area with respect to the image's original area; and For a list of items that is truncated to make it fit its block, the number of items truncated with respect to the total number of items.

The "change value" for content is as follows:

$$C_{content} = \Sigma_{all\ overlap\ changes} (K_{overlap} * (\text{change in overlapped area for block})/(\text{block's area})) + \Sigma_{all\ cropped\ images} (K_{cropping} * (\text{cropped area})/(\text{image's original area})) + \Sigma_{all\ truncated\ list\ of\ items} (K_{list-truncation} * (\text{\# of truncated items})/(\text{total \# of items})). \quad \text{Equation 4}$$

where $K_{overlap}$, $K_{cropping}$ and $K_{list-truncation}$ are weight constants.

Figure 3A:
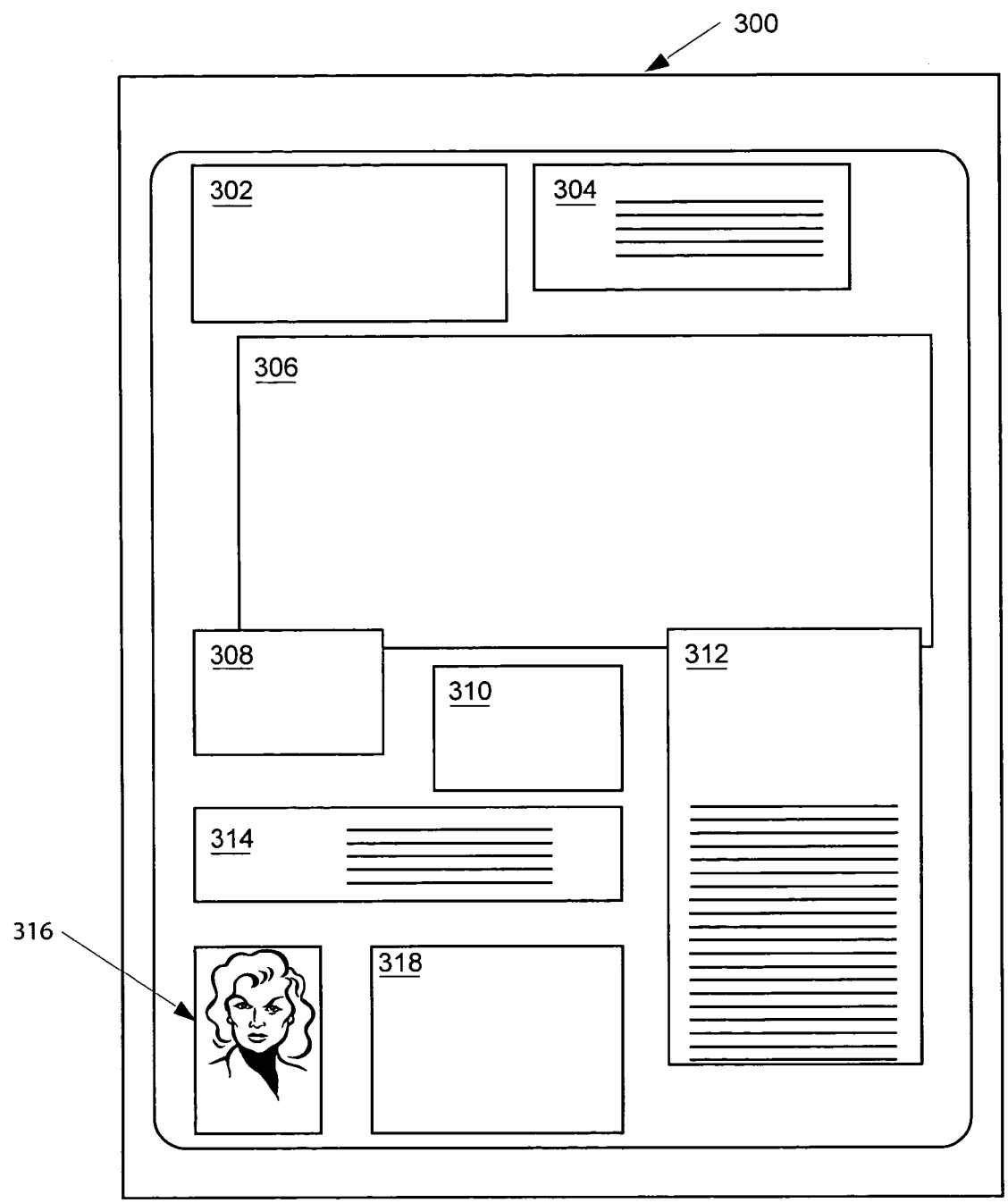
FIG. 3A shows a representation of the document of FIG. 2 before adjustment.

As described above, the document 200 is a one page real estate flyer. In FIG. 3A of the drawings, a version of a document 300 is shown with errors that require correction by modifying the document 300. Prior to carrying out the modification of the document 300, a set of document configuration constraints, being layout constraints, formatting constraints and content constraints, are generated. When modification of the document 300 is effected, these document configuration constraints must be satisfied to ensure that the change to the look and feel of the document 300 is minimized. Blocks 302-318 of the document 300 contain the same matter as the blocks 202-218 of the document 200 as described above.

The following layout constraints apply to the document 300:

- Adjacency graph constraints: The adjacency graph for the document 300 consists of edges such as block 304 is to the E of block 302, block 306 is to the S of block 302, blocks 304, 308 and 310 are to the N of block 314, etc.
- White space constraints: The white space constraint are specified for the document 300 as a whole as, for example, "the white space between any two blocks may not vary by more than 40%".
- Block size and aspect ratio constraints: The block size constraint is specified for all blocks 302-318 in the document 300 as, for example, "the block size for any block may not vary more than 40%". Similarly, the aspect ratio constraint is specified for all image blocks 302, 306, 308 310 and 316, for example, as "the aspect ratio for all images must be maintained".
- Block position constraints: The block position constraint is specified for all blocks 302-318 in the document 300 as, for example, "no block may be moved more than 0.5 inches from its original position either in the horizontal or in the vertical direction".
- Alignment constraints: In general, alignment constraints are governed by aligned edges of blocks in any direction. As can be seen from the document, the blocks 302, 308 and 316 are left aligned; blocks 302 and 304 are top aligned; blocks 316 and 318 are top aligned and blocks 308 and 312 are top aligned.
- Overlap constraints: For blocks 306 and 308, the overlap constraint is specified, for example, as "the maximum change in overlap allowed is 10% of the original value". A similar constraint is specified for blocks 306 and 312.

The formatting constraints applicable to the document 300 are:

- Font size constraints: A constraint is specified for the text in block 314 as "the font size of this block may range from 11 pts to 13 pts".
- Font type constraints: A constraint is specified globally for all the blocks 302-318 of the document 300 as "all text must be in Times New Roman" font.
- Font style constraints: A constraint is specified that the text in block 304 "must be bold".
- Color constraints: A color constraint is specified for the text in block 304 that the text "must be red".

The content constraints applicable to the document 300 are as follows:

- Constraints on images: As block 306 is overlapped by block 308, an overlap constraint is specified for the image in block 306 as "the image may be overlapped up to 0.1 inches from all 4 sides". A cropping constraint is specified for the image in block 306 as "the image may be cropped up to 0.1 inches from all 4 sides".
- Constraints on list of items: For the list of items in block 312, a constraint is specified as "the minimum number of items to be included in the list is 12".

The above constraints define the range of look and feel deviation permitted by the end user and which must be satisfied while performing layout adjustments when modifying the document 300.

In addition to the document configuration constraints, ie. the layout, formatting and content constraints, specified above, a "change value" function for the document 300 is also specified. In this case, it is assumed that equal weighting is given to each of the layout, formatting and content aspects of the look and feel of the document 300. Thus, the "change value" is, following Equation 1 above, the following:

$$C_{document\ 200} = C_{layout} + C_{formatting} + C_{content} \quad \text{Equation 5}$$

The three portions of Equation 5 could be written to also give equal weight to all constituent portions. of Equation 5. Hence, $$C_{formatting} = \Sigma_{all\ font\ size\ changes} \text{(font size change in points)} + \Sigma_{all\ font\ type\ changes} \text{(font type change)} + \Sigma_{all\ font\ style\ changes} \text{(font style change)} + \Sigma_{all\ color\ changes} \text{(Euclidian distance between the original and the adjusted color)} \quad \text{Equation 6}$$

and $$C_{content} = \Sigma_{all\ overlap\ changes} \text{((change in overlapped area for block)/(block's area))} + \Sigma_{all\ cropped\ images} \text{((cropped area)/(image's original area))} + \Sigma_{all\ truncated\ list\ of\ items} \text{((\# of truncated items)/(total \# of items))} \quad \text{Equation 7}$$

In the document 300 in FIG. 3A of the drawings, there are a number of layout errors that require correction. The layout errors need to be corrected by modifying the layout of the document 300 while minimizing the change to the look and feel of the document 300. The change to the look and feel is minimized by satisfying the set of document configuration constraints specified above. Because the only errors relate to layout issues, no changes in respect of formatting or content meed to be made. As a result, the formatting and content constraints of the set of document configuration constraints are automatically satisfied.

Thus, the adjustments are achieved only with block resizing and repositioning and without any font size, style or content modifications.

The errors in the document 300 of FIG. 3A are the following:

- The list of items in block 312 is truncated due to lack of space for the text in the block 312;
- The text in block 314 is truncated due to lack of space for the text in the block 314;
- The photograph in block 316 has an incorrect aspect ratio due to a mismatch between the aspect ratios of the image and the block 316.

Figure 3B:
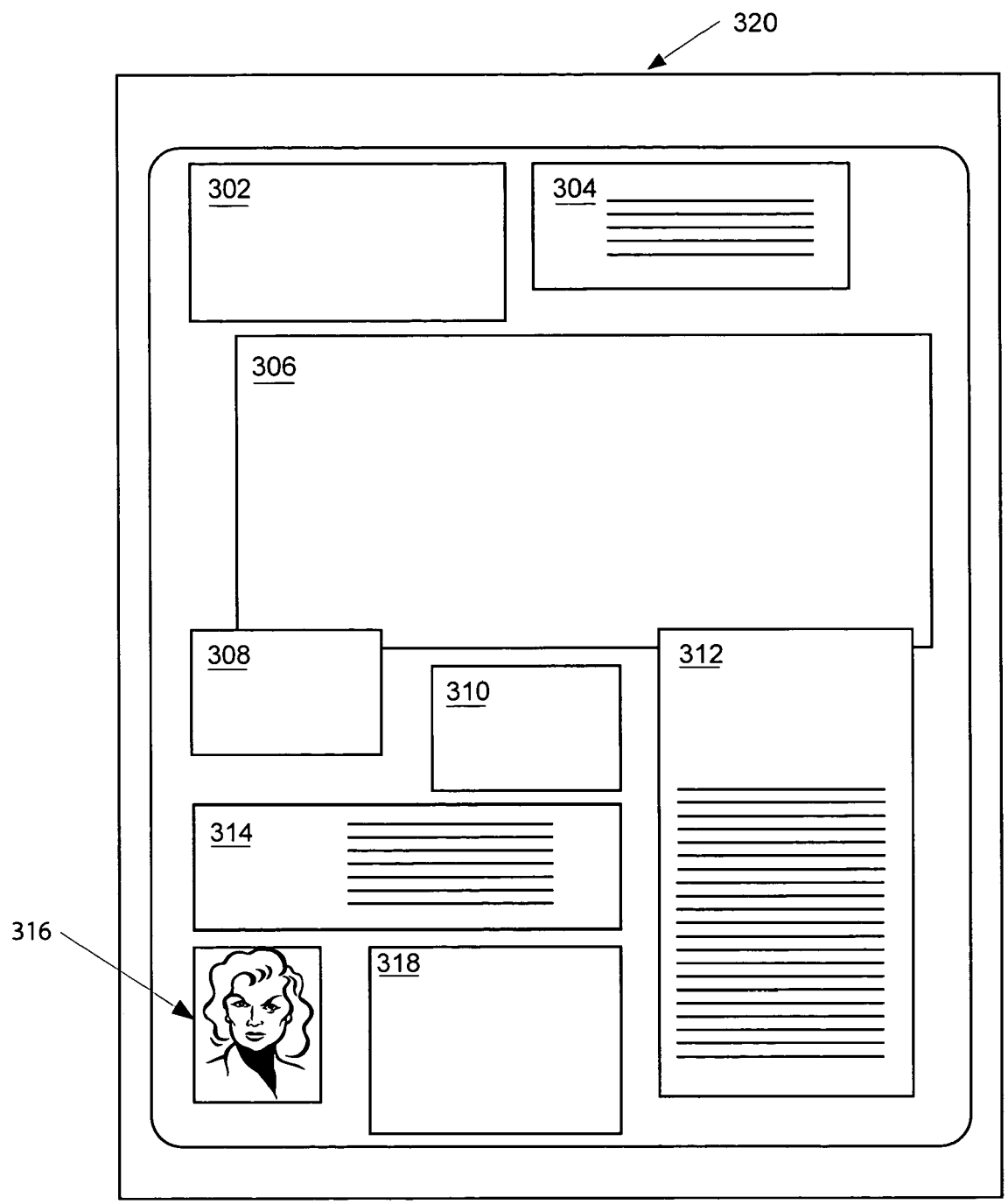
FIG. 3B shows the representation of the document of FIG. 3A after adjustment.

The document 300 is shown in a corrected format as document 320 in FIG. 3B of the drawings. The document 320 has had the layout errors of the document 300 corrected while still satisfying the constraints described earlier. More particularly, the height of the block 314 has been increased to accommodate the text. The height of block 312 has also been increased to accommodate the full list of items and, in so doing, overcoming the truncation error. The height of the block 316 has been reduced so that it matches the aspect ratio of the photograph contained in the block 316.

The layout constraints are still satisfied while doing these adjustments. For example, the white space between two blocks is never changed by more than 40%. The sizes of the blocks 312, 314 and 316 are maintained within 40% of their original size. The aspect ratios of images are maintained. In the case of the block 316, where it had the incorrect aspect ratio, it is the aspect ratio of the block 316 that has been changed rather than that of the image in the block 316. The adjacency graph of the blocks 302-318 is maintained. For example, prior to modification or adjustment of the document 300, the block 304 was to the east of block 302. In the case of the modified document 320, this still applies. The overlap constraints are also satisfied in that the amount of overlap is maintained while doing the adjustments.

As indicated above, because the formatting and the content of the document 300 were not altered, the formatting and content constraints are satisfied automatically.

It is to be noted that, while the layout errors in the document 300 have been corrected using only the layout constraints, the document 200 could be adjusted using one or more of the other constraints in addition to, or instead of, the layout constraints. For example, in the case of the block 314, to make the text fit in the block 314, a change to the formatting constraint of font size could have been used. In other words, the size of the font of the text is reduced to ensure that the text fits into the block 314. Instead a combination of "block size increase" (a layout constraint) and "font size decrease" (a formatting constraint) could have been used. In general, however, it is easier to use layout constraints, when appropriate, than the other constraints to effect document adjustment.

A document configuration adjustment algorithm is configured at run-time on the basis of the amount of change allowed in terms of the "change value", as set out above. It will therefore be appreciated that the "change value" is used to quantify the extent to which the look and feel of the document 320 has been changed in comparison with the unmodified document 300.

Figure 4:
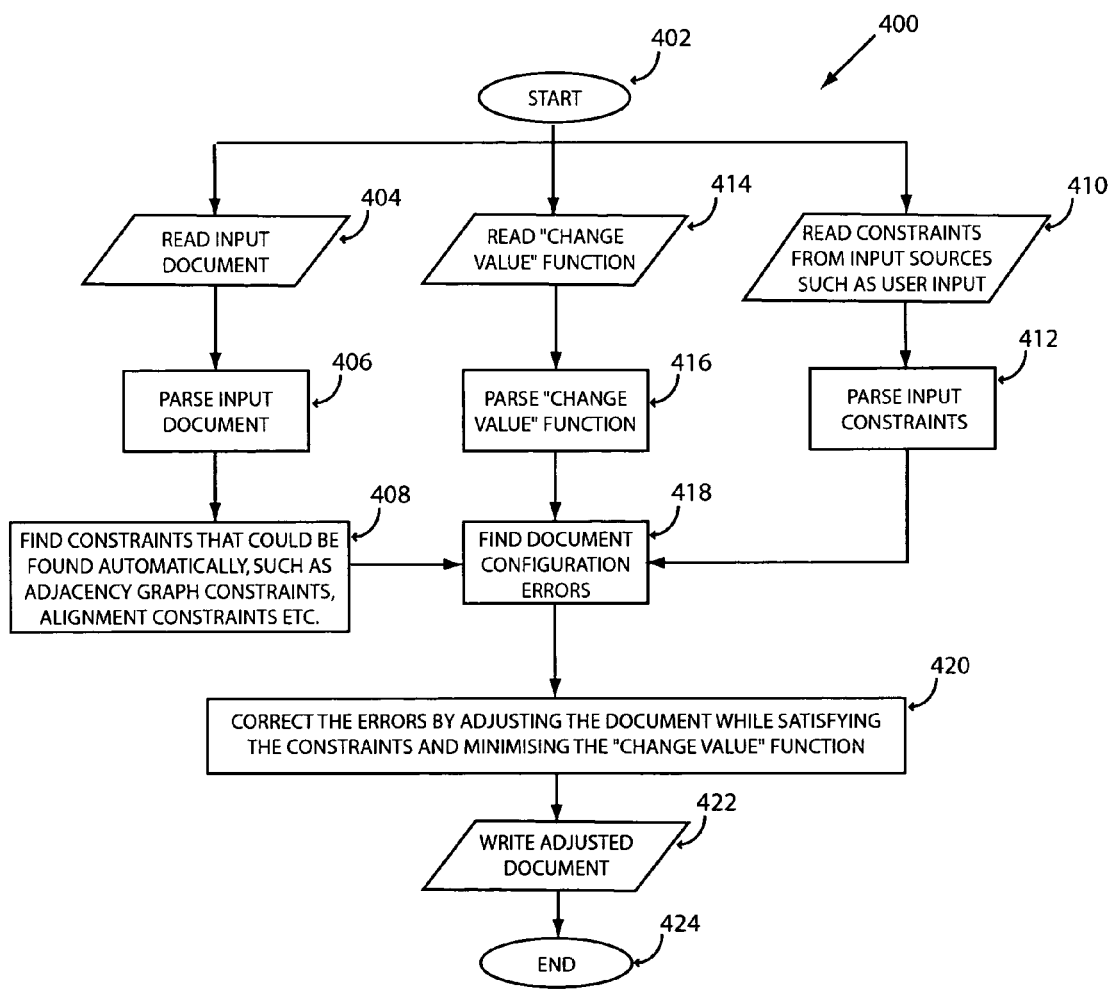
FIG. 4 shows a flow chart of an algorithm for implementing an embodiment of the invention.

FIG. 4 of the drawings sets out a flow chart 400 of typical operating steps in a method of adjusting a document configuration while minimizing the change to the look and feel of that document.

After a start step 402, a first branch of the process involves reading the document to be modified at step 404 followed by parsing document at step 406 into its component blocks. At step 408, those constraints that can be found automatically, such as an adjacency graph constraint of the blocks and the alignment constraints of the blocks are generated.

In a second branch of the process, constraints from sources other than the document itself, for example, user input constraints are read at step 410 followed by being parsed at step 412.

A third branch of the process involves determining a "change value" function applicable to the document to be modified at step 414 followed by parsing the "change value" function at step 416.

The three initial branches then come together at step 418 where the errors in the document configuration are determined. This is followed by adjusting or modifying the document at step 420 while satisfying the constraints and minimizing the "change value" function. Finally, the adjusted document is generated at step 422 and the process ends at 424.

It is a particular advantage of the invention that the change to the look and feel of a document is minimized same following document configuration adjustment and, further, that a measure is provided for determining the change to the look and feel quantitatively.

Hence, a method and system are provided which enables a user automatically to adjust the configuration of documents for various purposes such as for correcting configuration errors, to reuse a document for a different purpose and/or to adjust the style of the document. The need for employing a graphic artist to re-configure the document is obviated resulting in significant cost savings and time savings.

Still further, a method and system are provided for minimising changes to the look and feel of the layout of a document as much as possible and, where changes to the look and feel do occur, how to determine the extent of those changes quantitatively. The "change value" function is directly related to the cost of modifying the document. Hence, the cost of modifying the document can be minimized by minimizing the value of the "change value" function.

It is yet a further advantage of the invention that a system and method are provided which does not rely on any underlying predetermined or pre-generated page framework. Rather, the constraints of document components relative to one another and/or the content of those document components are determined. The versatility of the system and method is thus enhanced.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A computer-implemented method of adjusting a document configuration, the method comprising:
   generating a set of document configuration constraints that define an acceptable range of change in a look and feel of a document, a configuration of which is to be adjusted; and
   modifying the document configuration while satisfying the set of document configuration constraints to minimize the change in the look and feel of the document.

2. The method of claim 1 which includes parsing the document to determine components of the document and the document configuration constraints applicable to those components.

3. The method of claim 2 which includes determining at least certain of the document configuration constraints from the components of the document.

4. The method of claim 2 which includes using a "change value" function to quantify the extent to which the look and feel of the document has been changed.

5. The method of claim 1 which includes obtaining at least certain of the document configuration constraints extraneously of the document.

6. The method of claim 5 which includes obtaining at least certain of the document configuration constraints from an input source.

7. The method of claim 1 which includes selecting the document configuration constraints from the group comprising: layout constraints, formatting constraints, content constraints and combinations of the aforegoing.

8. A computer-implemented method of adjusting a document configuration, the method comprising:
   generating a set of document configuration constraints that define an acceptable range of change in a look and feel of a document, a configuration of which is to be adjusted;
   modifying the configuration of the document; and
   quantifying the extent to which the look and feel of the document has been changed as a result of the modification to the configuration of the document.

9. The method of claim 8 which includes using the set of document configuration constraints in a "change value" function for quantifying the extent to which the look and feel of the document has been changed.

10. A computer-implemented system for adjusting a document configuration, the system comprising:
    an analyser configured to determine a set of document configuration constraints that define an acceptable range of change in a look and feel of a document, a configuration of which is to be adjusted; and
    a modification module to modify the document configuration while satisfying the set of document configuration constraints to minimize the change in the look and feel of the document.

11. The system of claim 10 in which the analyser analyses the document to determine components of the documents and to determine the document configuration constraints applicable to the components.

12. The system of claim 11 in which the analyser determines certain of the document configuration constraints from the components of the document.

13. The system of claim 10 in which the analyser determines at least certain of the document configuration constraints from sources extraneous of the document.

14. The system of claim 10 in which the document configuration constraints are selected from the group comprising: layout constraints, formatting constraints content constraints and combinations of the aforegoing.

15. The system of claim 10 which includes a quantifier to quantify the extent to which the look and feel of the document has been changed.

16. The system of claim 15 in which the quantifier uses the set of document configuration constraints in a "change value" function to quantify the extent to which the look and feel of the document has been changed.

17. A computer-implemented system for adjusting a document configuration, the system comprising:
 an analyser configured to determine a set of document configuration constraints that define an acceptable range of change in a look and feel of a document, a configuration of which is to be adjusted;
 a modification module that uses the set of document configuration constraints in effecting modification of the document configuration; and
 a quantifier that quantifies the extent to which the look and feel of the document has been changed.

18. The system of claim 17 in which the quantifier uses the set of constraints in a "change value" function to quantify the extent to which the look and feel of the document has been changed.

19. A computer-readable medium having computer-executable instructions for performing a method for adjusting a document configuration, said method comprising:
 generating a set of document configuration constraints that define an acceptable range of change in a look and feel of a document, a configuration of which is to be adjusted; and
 modifying the document configuration while satisfying the set of document configuration constraints to minimize the change in the look and feel of the document.

20. The computer-readable medium of claim 19, wherein said method further comprises:
 parsing the document to determine components of the document and the document configuration constraints applicable to those components.

21. The computer-readable medium of clam 20, wherein said method further comprises:
 determining certain of the document configuration constraints from the components of the document.

22. The computer-readable medium of claim 19, wherein said method further comprises:
 obtaining some of the document configuration constraints extraneously of the document.

23. The computer-readable medium of claim 22, wherein said method further comprises:
 obtaining at least certain of said some of the document configuration constraints from an input source.

24. The computer-readable medium of claim 19, wherein said method further comprises:
 selecting the document configuration constraints from the group comprising: layout constraints, formatting constraints, content constraints and combinations of the aforegoing.

25. The computer-readable medium of claim 19, wherein said method further comprises:
 using a "change value" function to quantify the extent to which the look and feel of the document has been changed.

* * * * *

UNITED STATES PATENT AND TRADEMARK OFFICE
CERTIFICATE OF CORRECTION

PATENT NO.         : 7,395,510 B2                                        Page 1 of 1
APPLICATION NO. : 10/738178
DATED              : July 1, 2008
INVENTOR(S)        : Shridhar Diwan et al.

It is certified that error appears in the above-identified patent and that said Letters Patent is hereby corrected as shown below:

In column 8, line 25, delete "meed" and insert -- need --, therefor.

In column 10, line 28, in Claim 4, delete "claim 2" and insert -- claim 1 --, therefor.

In column 11, line 9, in Claim 14, after "formatting constraints" insert -- , --.

In column 11, line 15, in Claim 16, delete "sot" and insert -- set --, therefor.

In column 12, line 13, in Claim 21, delete "clam" and insert -- claim --, therefor.

Signed and Sealed this

Twenty-seventh Day of January, 2009

JOHN DOLL
*Acting Director of the United States Patent and Trademark Office*